United States Patent [19]

Lee et al.

[11] Patent Number: 5,163,055
[45] Date of Patent: Nov. 10, 1992

[54] COMMUNICATIONS SYSTEM USING A FAULT TOLERANT PROTOCOL

[75] Inventors: Jangsik Lee, Yorba Linda; Alexander Kasman, Sherman Oaks, both of Calif.

[73] Assignee: Telefonaktiebolaget LM Ericsson, Sweden

[21] Appl. No.: 544,675

[22] Filed: Jun. 27, 1990

[51] Int. Cl.$^5$ .............................................. G08C 25/02
[52] U.S. Cl. ........................................ 371/32; 371/33
[58] Field of Search ...................... 371/32, 2,1, 33, 30

[56] References Cited

U.S. PATENT DOCUMENTS

| | | | |
|---|---|---|---|
| 4,422,171 | 12/1983 | Wortley et al. ...................... | 371/32 |
| 4,432,090 | 2/1984 | da Silva ............................... | 371/32 |
| 4,584,684 | 4/1986 | Nagasawa et al. .................... | 37/33 |
| 4,584,685 | 4/1986 | Gajjar .................................. | 371/35 |
| 4,712,214 | 12/1987 | Meltzer et al. ...................... | 371/32 |
| 4,908,828 | 3/1990 | Tikalsky ............................. | 371/69.1 |

*Primary Examiner*—Jerry Smith
*Assistant Examiner*—Ly V. Hua
*Attorney, Agent, or Firm*—Johnson & Gibbs

[57] ABSTRACT

A system for the communication of data between digital devices uses a unique fault tolerant protocol wherein messages are exchanged in a format which allows for error detection and recovery, flow control and retransmissions. In the particular embodiment described, processors in a system for the recording and display of telephone traffic communicate using the aforementioned fault tolerant protocol.

8 Claims, 2 Drawing Sheets

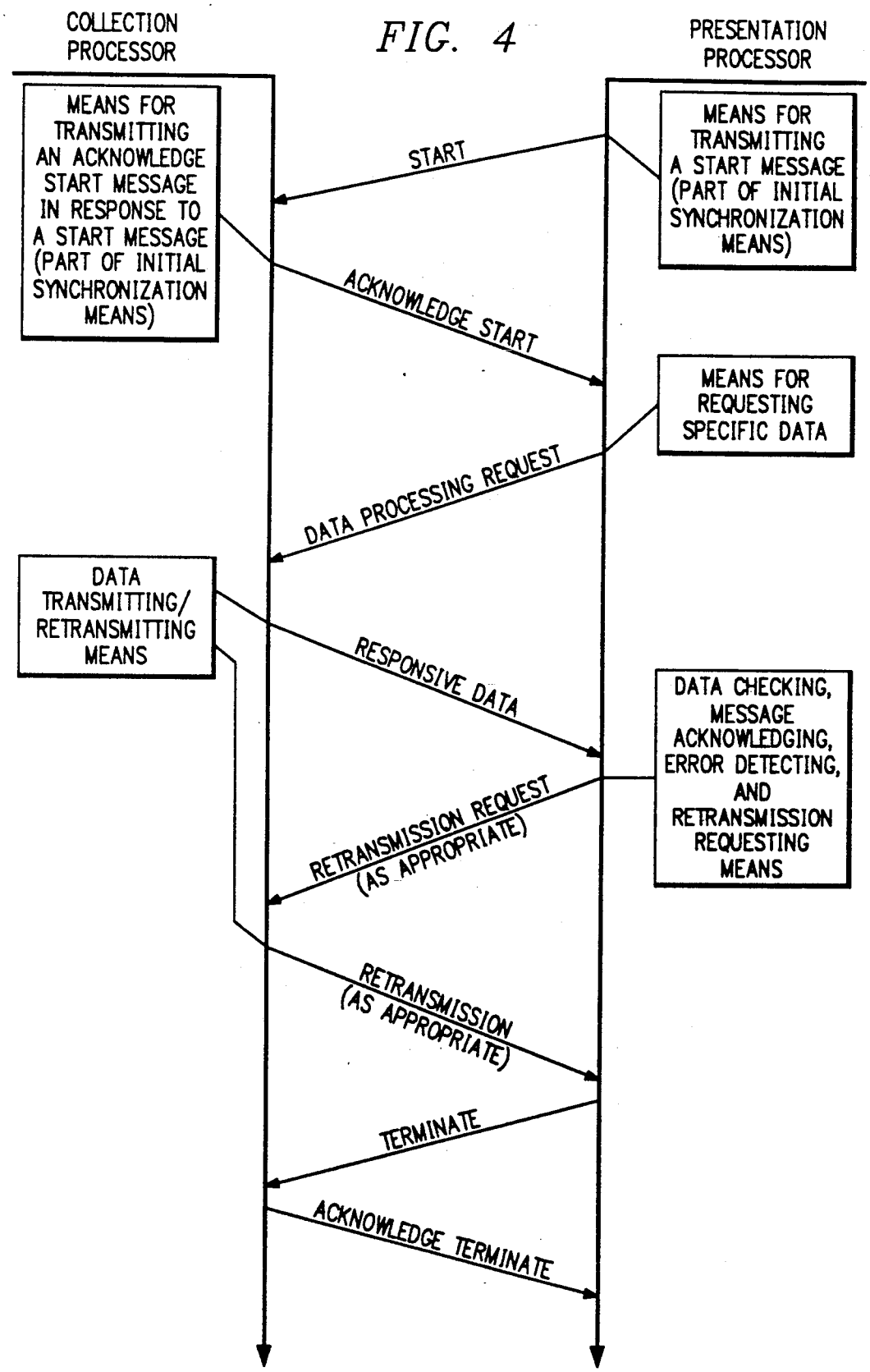

COMMUNICATIONS SYSTEM USING A FAULT TOLERANT PROTOCOL

CROSS REFERENCE TO RELATED APPLICATIONS

This application is related to the following U.S. patent applications:

| TITLE | INVENTOR(S) | SER. NO. |
|---|---|---|
| Communications Protocol for Switching Systems | Clary et al. | 07/544,839 |
| Language Independent Self-Centering Menu Handling of Traffic Recording Presentation | Lee | 07/544,679 |
| Graphic Value Indicator System | Diec et al. | 07/545,419 |
| Method and Apparatus for Error Tracking in a Multitasking Environment | Kasman | 07/544,413 |

All cross referenced applications have been filed on even date herewith and assigned to the assignee of the present invention.

All of these related applications are hereby incorporated herein by reference.

All cross referenced applications have been filed on even date herewith and are assigned to the assignee of the present invention. All of these related applications are hereby incorporated herein by this reference thereto.

BACKGROUND OF THE INVENTION

1. Field of the Invention

The present invention provides a means for effectively communicating data between processors using a unique protocol. More particularly, the present invention provides a method and apparatus for communicating messages in a given format which allows for improved error and flow control.

2. Description of Prior Art

Data communications, or computer communications, is the process of communicating information in a form suitable for processing by computers and peripheral devices that may be connected to those computers. Communications hardware is reasonably standard and generally presents few problems. However, when communication is desired among heterogeneous machines, i.e. machines made by different vendors or different models of machines made by the same vendor, the software development effort becomes increasingly difficult. Different vendors use different data formats and data exchange conventions. Even within one vendor's product line, different model computers may communicate in unique ways.

To facilitate computer communications and computer networking, computer vendors needed to adopt and implement a common set of conventions. However, in order to develop adequate standards, there needs to be a structure or architecture that defines the communication tasks. A formal hierarchial identification of all data communications network functions has been established by the International Standards Organizations ("ISO") and referred to as the ISO model for Open Systems Interconnection ("OSI"). This model identifies seven (7) distinct levels, or layers, of functional requirements pertaining to a data communications network. Each layer (i) performs a related subset of the functions required to communicate with another system; (ii) relies on the next lower layer to perfrom more primitive functions and to conceal the details of those functions; and (iii) provides services for the next higher layer.

The OSI layers consist of (1) the physical layer which governs the physical interface between devices and the rules by which bits are passed from one to another; (2) the data link layer which attempts to make the physical link reliable, i.e. error-free, and provides the means to activate, maintain and deactivate the link; (3) the network layer which is responsible for establishing, maintaining, and terminating connections across an intervening communications facility; (4) the transport layer which insures that data units are delivered error-free, in sequence and without losses or duplications; (5) the session layer which provides means for two application processes to establish and use a connection, called a session; (6) the presentation layer which resolves differences in the syntax (representation) of the data exchanged between application entities and provides for the selection and subsequent modification of the syntax to be used; and (7) the application layer which contains management functions and other useful mechanisms to support distributed applications.

The OSI layers are defined so that changes in one layer do not require changes in the other layers. Communication is achieved by having corresponding or "peer" entities in the same layer in two different systems communicate via a protocol. A protocol is a set of rules governing a time sequence of events that take place between peer entities; that is, between equipment or layers on the same level.

The most common way in which protocols are realized is with the use of a header. When an application X has data to send to another application Y, it transfers those data to an application entity in the application layer. A header is appended to the data that contains the required information for the peer layer 7 protocol. The original data, plus the header, is now passed as a unit to layer 6. The presentation entity treats the whole unit as data, and appends its owns header. This process continues down through layer 2, which generally adds both a header and a trailer. This layer 2 unit, called a frame, is then passed by the physical layer onto the transmission medium. When the frame is received by the target system, the reverse process occurs. As the data ascends, each layer strips off the outermost header, acts on the protocol information contained therein, and passes the remainder up to the next layer.

In general, the reliability of a data communications system may be directly traced to the functional effectiveness of the data link layer protocol being used. Because data is usually sent in blocks (frames), the beginning and end of each block (frame) must be clearly identifiable. Further, the sending station must not send frames at a rate faster than the receiving station can absorb them. Additionally, the bit erors introduced by the transmission system must be corrected. Also, the receiver must be able to distinguish control information from the data being transmitted.

The present invention provides method and apparatus for communicating data using a protocol which uniquely meets the aforementioned requirements and objectives of an effective data communications system.

SUMMARY OF THE INVENTION

A communications system uses a fault tolerant protocol specified by a message format which includes an indication of the start of a message; an indication of the length of the message; an indication of the sequence number of the message; an indication of the type of the message; an indication of the contents of the message; a verification for detecting errors in the message; and an indication of the end of the message. Communication is initiated with the transmission of a start message and the reception of an acknowledge start message. The acknowledge start message is followed by the transmission of a data processing function request and the reception of a series of text messages, in sequence, containing the requested data. Errors in transmission or reception of text messages are recovered by retransmitting the text message which sequentially follows the last text message correctly received.

The protocol of the present invention may be used, for example, to communicate data relating to telephone traffic between a collection processor and a presentation processor in a private branch exchange telephone system. The presentation processor sends a message to the collection processor to initiate communication. Once communication is established, the presentation processor sends messages containing data processing requests and the collection processor responds accordingly. Messages are exchanged in the format specified hereinabove which allows for improved error detection and recovery, flow control and retransmission of messages.

BRIEF DESCRIPTION OF THE DRAWINGS

The present invention will be better understood and its numerous objects and advantages will become apparent to those skilled in the art by reference to the following drawings in which.

DETAILED DESCRIPTION

Although the method and apparatus of the present invention can be used for effectively communicating data between any two digital devices, the following description specifically relates to a particular embodiment of the present invention involving a system for the monitoring and recording of traffic signals in a private branch exchange telephone system. This particularly described embodiment is for purposes of illustration only and should not be understood to limit, in any way, the scope of the present invention or its teachings; rather, the present invention should be understood to broadly relate to all communication of data between digital devices.

Figure 1:
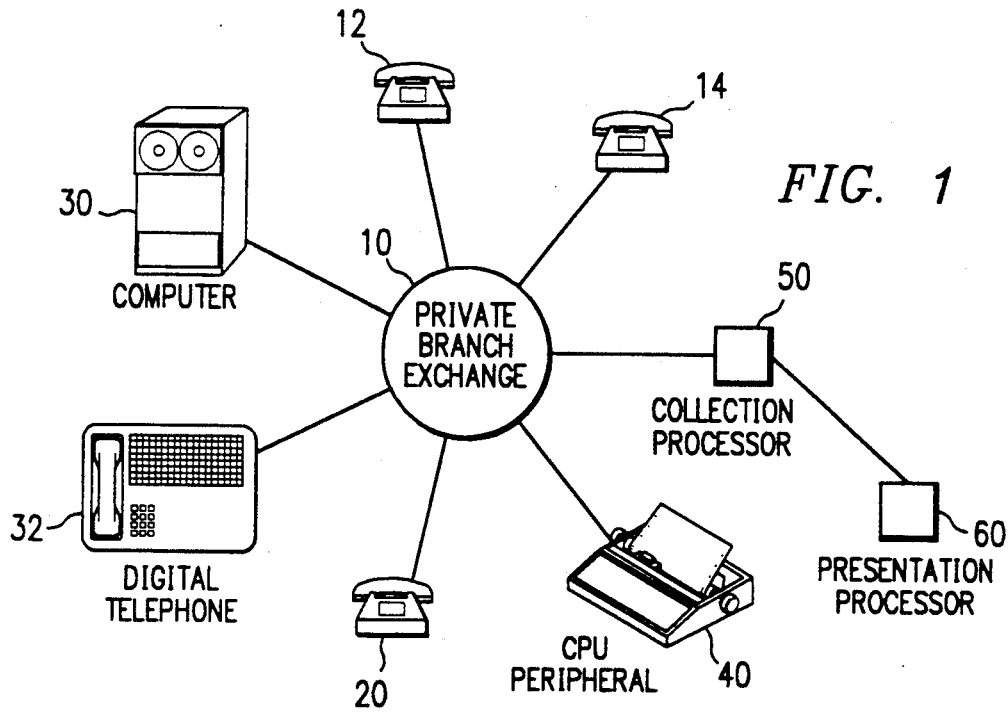
FIG. 1 is a schematic diagram of a private branch exchange telephone system including a collection processor and a presentation processor which communicate data according to the teachings of the present invention.

Referring first to FIG. 1, a conventional private branch exchange (PBX) is represented as a central node or switch 10. The PBX 10 may be seen connected to a plurality of telephone sets 12, 14 and 20, and also to a plurality of digital data devices such as a computer 30, a digital telephone 32 and a CPU peripheral 40. The PBX 10 may be an analog (voice) PBX which can handle telephone sets directly and uses modems to accommodate digital data devices. Alternatively, the PBX 10 may be a digital (data) PBX which can handle digital data devices directly and uses coder-decoders, or codecs, to accommodate telephone sets. The PBX 10 may also be an integrated analog/digital PBX which can simultaneously handle voice and data communications. In any event, data regarding analog or digital traffic is monitored and recorded or "retrieved" by a collection processor 50 connected to the PBX 10. In other conventional architectures, the recording functions of the collection processor 50 may be implemented within the PBX 10. The teachings of the present invention, however, are equally applicable regardless of whether these functions are performed internally by the PBX 10 or externally by the collection processor 50. In the remainder of the discussion, it will be assumed that the monitoring and recording of traffic is done externally by the collection processor 50.

It has been deemed desirable in the past to display particular aspects of telephone traffic through a PBX, such as the number and frequency of calls, the intervals therebetween, busy signals, etc., graphically on a CRT or similar device. To this end, data collectd by a collection processor is transmitted to a presentation processor which processes and presents the data in graphical form. FIG. 1 shows a presentation processor 60 connected to the collection processor 50. However, because of limitations in prior art protocols, some of the data transmitted by a collection processor to a presentation processor was lost or damaged and could not be recovered. In some instances, more data was transmitted by the collection processor than could be adequately processed by the presentation processor. The present invention guards against the foregoing difficulties and significantly improves the reliability of such data transfers.

Figure 2:
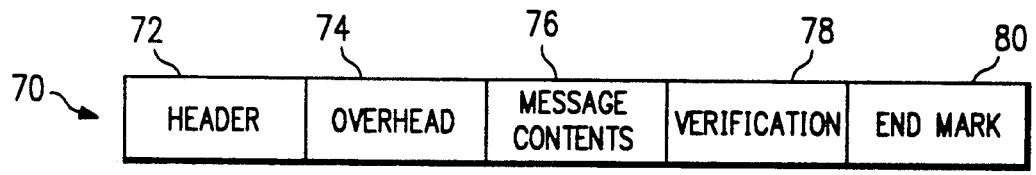
FIG. 2 is a schematic diagram of a logical unit of data transfer or message format used in the communication of data between the collection processor and the presentation processor shown in FIG. 1.

Referring next to FIG. 2, a logical unit of data transfer or message format 70 structured in accordance with the present invention may now be seen. The message format 70 consists of a header field 72, an overhead field 74, a message contents field 76, a verification field 78 and an end mark field 80. The header field 72 defines control signals which precede user data. The overhead field 74 defines such message parameters as length, sequence number and so forth. The message contents field 76 contains the actual user data. The verification field 78 is used for error detection and correction such as in a checksum method of calculation. The end mark field 80 signifies the end of a particular message. A more specific description of one configuration of these fields is given in Section 3.2 of the Fault Tolerant Protocol set out below.

Figure 3:
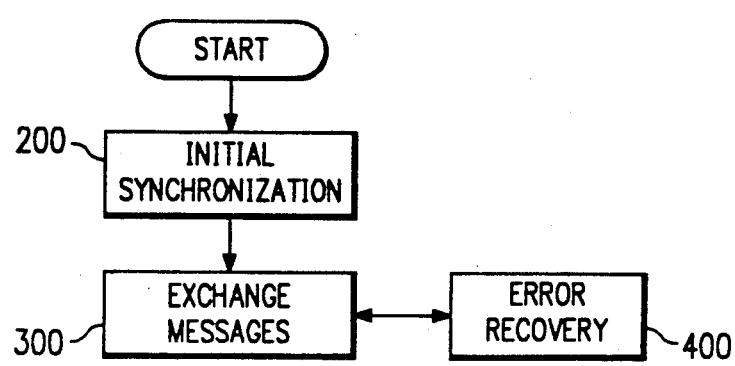
FIG. 3 is a simplified schematic flow chart diagram of the flow control steps performed in the communication of data between the collection processor and the presentation processor shown in FIG. 1 and, FIG. 4 is a timing flow chart of operation of an embodiment of the present invention.

Referring next to FIG. 3, a simplified schematic flow chart diagram of the flow control steps performed by the system of the present invention to communicate data may now be seen. At block 200, the system sets up a communication path and initializes for the first synchronization. After a successful initial synchronization, messages in message format 70 are exchanged at block 300. During this communication, messages can be damaged or lost. Such errors are detected and the damaged or lost messages are recovered, i.e. retransmitted, at block 400. These flow control steps are also described in more detail in the Fault Tolerant Protocol set out at length below.

The general operation of the present invention in practice may be illustrated in connection with the communication of data between the collection processor 50 and the presentation processor 60 seen in FIG. 1. The presentation processor 60 initiates the connection, if necessary, then sends a message to start communication. Upon the first communication being successfully established, the presentation processor 60 requests the performance of a "task" (data processing function) from the collection processor 50. The collection processor 50 responds by performing the data processing function specified by the received data processing request signal and transmits collected traffic measurement (TM) or least cost routing (LCR) data to the presentation processor 60. Messages are exchanged between the collection processor 50 and the presentation processor 60 in message format 70 which allows for improved error detection and recovery, flow control and retransmissions. When a "task" requested by the presentation processor 60 is completed, the presentation processor 60 terminates the session. The interplay between the collection processor 50 and the presentation processor 60 and the types of "task" referred to herein are described in further detail in section 4 et seq. of the Fault Tolerant Protocol set forth immediately below. See also FIG. 4. It should be understood, moreover, that the Fault Tolerant Protocol set out below is not limited to communications between a presentation processor and one collection processor but may be used to effect the transfer of TM and LCR data from a plurality of collection processors connected to the presentation processor.

| | Fault Tolerant Protocol Contents |
|---|---|
| 1. | Protocol Definition |
| 2. | Layer 1 Definition |
| 3. | Layer 2 Definition |
| 3.1 | Message Structure |
| 3.2 | Field Description |
| 3.3 | Flow Control Rules |
| 3.4 | Flow Description |
| 3.4.1 | Initial Synchronization |
| 3.4.2 | Normal Message Flow |
| 3.4.3 | Recovery Scenarios |
| 4. | Application Layer Definition |
| 4.1 | Structure Description |
| 4.2 | Field Description |
| 4.2.1 | Byte 1 Description |
| 4.2.2 | Description for the Rest of the Bytes |
| 4.3 | Application Messages Sequence |

1. Protocol Definition

This protocol describes the communications between the collection processor 50 and the presentation processor 60. However, the concepts of this protocol are applicable generally to the communication of data between two digital devices.

2. Layer 1 Definition

Layer 1 is defined as RS-232C and the corresponding equipments are communication (COM) port on IBM PC AT/XT or its compatibles. Between two PCs, some communication equipment, such as a set of modems and a signal booster may be included.

3. Layer 2 Definition

This layer defines the message structure as a total entity and its "outer field" descriptions. "Outer field" herein includes STX, number of bytes, message sequence number, message type, exclusive-OR sum and ETX. It also describes the rules of communications and the flow control methods.

3.1 Message Structure

The message structure is defined as follows:

| | |
|---|---|
| STX (hex FF) | 1 byte |
| Number of Bytes | 1 byte |
| Message Sequence Number | 1 byte |
| Message Type | 1 byte |
| Message Contents | up to 74 bytes |
| Exclusive OR sum | 1 byte |
| ETX (hex FF) | 1 byte |

3.2 Field Description

STX (hex FF): indicates the start of the message.

Number of Bytes: the number of bytes from the message sequence number through ETX Message Sequence Number: serial number varies from hex 80 through hex 8F. It is used to identify the message for retransmission.

Message Type: determines the general characteristics of the message as follows:

hex 00: text (TXT)—regular message. When one party receives this kind of message, it must return an ACK. If this kind of message is sent, the sender increases the send counter while the receiver increase the receive counter.

hex 01: start (ST)—start communications. This message is the first message that one party can send. The receiving party must send ACKST without increasing receiving counter.

hex 02: acknowledge start (ACKST)—acknowledge of start communications. When one party receives ST, that party must respond with this message. Receiving counter will not be incremented.

hex 03: terminate (TER)—terminate communications. This message is sent when one party decides to terminate the communications. When the other party receives this message, it must respond with ACKTER.

hex 04: acknowledge of termination (ACKTER)—acknowledge of termination of communications. This is the last message of the communication. When one party receives TER, it must respond with this message.

hex 05: receive ready (RR)—receiver can receive any message. This message is used to inform a party that the other party is ready to receive any message. Upon receiving this message, the party can send any regular message.

hex 06: receive not ready (RNR)—receiver is not ready to receive any message.

hex 07: reject (RJ)—send message again as indicated. The message contents should contain the rejected message sequence number and the original sender is expected to retransmit the message indicated in the contents of the currently available message.

hex 08: reset (RST)—reset the message sequence number to zero. This message is used to re-synchronize the send counter and receive counter. This message will prevent message retransmission from diverging.

hex 09: acknowledge (ACK)—acknowledge of the message. If the message type is ACK, the first byte of the message contents should contain the acknowledged message sequence number (80-8F).

Message Contents: variable length up to 74 bytes. The definition of this will be clarified in the Application Layer section.

Exclusive OR Sum: exclusive OR sum from the Number of Bytes through the end of Message Contents.

ETX (hex FF): indicates the end of the message.

3.3 Flow Control Rules

Rule (1) The communication begins with sending ST message.

Rule (2) The communication terminates with sending ACKTER message.

Rule (3) The messages ST and ACKST imply that the party is ready to receive (RR).

Rule (4) The messages ST, ACKST, TER, ACKTER, RR, RNR, RJ, ACK and RST do not increase the send/receive counter and the receiver must not respond by ACK.

Rule (5) The message ACK includes the message sequence number.

Rule (6) The message RJ includes the message sequence number.

Rule (7) The time-out for ACK takes place within 2 seconds after sending the message.

Rule (8) Another message may be sent without receiving ACK of the previous message.

Rule (9) The time-out remembers the message and retransmits the same message and more if any.

Rule (10) ACK can be sent regardless of RR/RNR status.

Rule (11) TXT message will change send/receive counter.

3.4 Flow Description

This section provides examples of the flow control.

3.4.1 Initial Synchronization

This is the first sequence of messages that one party can send and to which the other party can respond.

```
sender                                          receiver
STX(FF)
04
80       =================>
01
85
ETX(FF)
                                                STX(FF)
                                                04
                                                80
         <=================                     02
                                                86
                                                ETX(FF)
```

3.4.2 Normal Message Flow

After the successful initial synchronization, messages can be sent from sender to receiver. The receiver is expected to send acknowledge immediately after correctly receiving message. The MSG herein is of TXT type message.

```
sender                                          receiver
MSG    =================>
       <=================                       ACK
```

3.4.3 Recovery Scenarios

This section provides some cases that the protocol recovers from the erroneous situations.

3.4.3.1 Recovery from Loss of ACK

This is the case that one ACK is lost before the original sender sends the next message.

```
sender                                          receiver
MSG1   =================>
       <=================                       ACK1
MSG2   =================>
       <=================                       ACK2
MSG3   =================>
       <======lost========                      ACK3
timer expired
MSG3   =================>
       <=================                       RJ4
MSG4   =================>
```

3.4.3.2 Recovery from Loss of Last Message

This is the case that sender's message got lost so that the receiver cannot send back the ACK.

```
sender                                          receiver
MSG1   =================>
       <=================                       ACK1
MSG2   =================>
       <=================                       ACK2
MSG3   =======lost=======>
time expired
MSG3   =================>
       <=================                       ACK3
```

3.4.3.3 Recovery from Out of Sequence

This is the case that sender sends two messages and the receiver just receives the latter message.

```
sender                                          receiver
MSG1   =================>
       <=================                       ACK1
MSG2   =================>
       <=================                       ACK2
MSG3   =======lost=======>
MSG4   =================>                       discarded
       <=================                       RJ3
MSG3   =================>
       <=================                       ACK3
MSG4   =================>
       <=================                       ACK4
```

3.4.3.4 Recovery from More Than One Message Loss

This is the case that sender sends three messages and the receiver just receives the last message.

```
sender                                          receiver
MSG1   =================>
       <=================                       ACK1
MSG2   =======lost=======>
```

```
MSG3   = = = = = = = lost = = = = = = = >
MSG4   = = = = = = = = = = = = = = = = = >    discarded
       < = = = = = = = = = = = = = = = =      RJ2
MSG2   = = = = = = = = = = = = = = = = = >
       < = = = = = = = = = = = = = = = =      ACK2
MSG3   = = = = = = = = = = = = = = = = = >
       < = = = = = = = = = = = = = = = =      ACK3
MSG4   = = = = = = = = = = = = = = = = = >
       < = = = = = = = = = = = = = = = =      ACK4
```

4. Application Layer Definition

This section describes the actual message definition which appears in the message contents.

4.1 Structure Description

The message contents have variable length. If the message type is of ST, ACKST, TER, ACKTER, RR, RNR or RST, the message contents do not exist. If the message type is of ACK or RJ, the message contents will have one byte and the value of this byte will be 80 through 8F. If the message type is of TXT, the message contents will have more than one byte and the value of the first byte will be less than 80. The message contents are further classified as follows:

| | |
|---|---|
| Byte 1 | message sequence number or message application number |
| Byte 2 | |
| Byte 3 | |
| Byte 4 | |
| Byte 5 | |
| . | |
| . | |
| . | |
| Byte last | variable length |

4.2 Field Description

4.2.1 Byte 1 Description

"Byte 1" of the message as described above determines what kind of message it is. If the value of Byte 1 is greater than or equal to 80, the message is ACK or RJ and the next byte is the message sequence number of the message acknowledge or rejected by the far end receiver. If it is less than 80, the first byte is the application message number as follows:

```
00   request to send TM and LCR TM data as specified in the
     following bytes:
     Byte 2     starting year
     Byte 3     starting month
     Byte 4     starting day
     Byte 5     ending year
     Byte 6     ending month
     Byte 7     ending day (ending day includes the day)
01   completion of request to send TM and LCR TM data (no
     byte followed)
02   here is MENO (directory) information
03   here is the end of MENO (directory) information (no
     byte followed)
04   here is the TM data
05   here is the end of TM data (no byte followed)
06   here is the LCR TM data
07   here is the end of LCR TM data (no byte followed)
08   here is the LCR queue data
09   here is the end of LCR queue data (no byte followed)
0A   request to activate LCR TM retrieval as specified
     Byte 2     starting date - MM
     Byte 3     starting date - DD
     Byte 4     starting date - YY
     Byte 5     ending date - MM
     Byte 6     ending date - DD
     Byte 7     ending date - YY
     Byte 8     starting hour
     Byte 9     ending hour (ending hour does not include
                the hour)
     Byte 10    destination number 1 (D0 D1) Hex F
     Byte 11    destination number 1 (D2 D3) for null
     Byte 12    destination number 1 (D4 D5)
     Byte 13    destination number 2
     .
     .
     .
     Byte last
     if bytes 10 and 11 are FF, it means all destinations
0B   request to activate LCR queue retrieval as specified
     Byte 2     starting hour
     Byte 3     ending hour (ending hour does not include
                the hour)
0C   request to deactivate LCR TM or LCR queue retrieval
     whichever has been activated
     Byte 2 -   0   deactivation for LCR TM
                1   deactivation for LCR queue
                2   deactivation for LCR TM and queue
0D   request to list LCR TM and/or queue retrieval
0E   response to the request to list LCR TM retrieval
     Byte 2     starting date - MM
     Byte 3     starting date - DD
     Byte 4     starting date - YY
     Byte 5     ending date - MM
     Byte 6     ending date - DD
     Byte 7     ending date - YY
     Byte 8     starting hour
     Byte 9     ending hour (ending hour does not include
                the hour)
     Byte 10    destination number 1 (D0 D1) Hex F
     Byte 11    destination number 1 (D2 D3) for null
     Byte 12    destination number 1 (D4 D5)
     Byte 13    destination number 2
     .
     .
     .
     Byte last
     if bytes 10 and 11 are FF, it means all destinations
0F   response to the request to list LCR queue retrieval
     Byte 2     starting hour
     Byte 3     ending hour (ending hour does not include
                the hour)
10   request to activate auto print as specified
     Byte 2     starting year
     Byte 3     starting month
     Byte 4     starting day
     Byte 5     starting hour
     Byte 6     starting minute
     Byte 7     days of the week b0 b1 b2 b3 b4 b5 b6 b7
                b0 = 1 Sunday       activated
                b1 = 1 Monday       activated
                b2 = 1 Tuesday      activated
                b3 = 1 Wednesday    activated
                b4 = 1 Thursday     activated
                b5 = 1 Friday       activated
                b6 = 1 Saturday     activated
                b7 = not used
11   request to deactivate auto print
12   request to list auto print
13   response to the request to list auto print
     Byte 2     starting year
     Byte 3     starting month
     Byte 4     starting day
     Byte 5     starting hour
     Byte 6     starting minute
     Byte 7     days of the week b0 b1 b2 b3 b4 b5 b6 b7
                b0 = 1 Sunday       activated
                b1 = 1 Monday       activated
                b2 = 1 Tuesday      activated
                b3 = 1 Wednesday    activated
                b4 = 1 Thursday     activated
                b5 = 1 Friday       activated
                b6 = 1 Saturday     activated
                b7 = not used
     if Byte 2 is FF, it means "no auto print active"
14   request to delete stored data as specified
```

|    |         |                                              |
|----|---------|----------------------------------------------|
|    | Byte 2  | starting year                                |
|    | Byte 3  | starting month                               |
|    | Byte 4  | starting day                                 |
|    | Byte 5  | ending year                                  |
|    | Byte 6  | ending month                                 |
|    | Byte 7  | ending day (ending day includes the day)     |
| 15 | request performed successfully |                        |
|    | Byte 2  | message number which was performed           |
| 16 | request not performed |                                 |
|    | Byte 2  | message sequence number                      |
|    | Byte 3  | byte 1 of the message that has not performed |
|    | Byte 4  | detail reason: contents to be defined        |
| 17 | request to send alarm-log |                             |
| 18 | here is alarm-log |                                     |
| 19 | here is the end of alarm-log |                          |

4.2.2 Description for the Rest of the Bytes

The rest of the bytes may contain any value depending on the first byte value. For details, refer to the previous section.

4.3 Application Messages Sequence

The section describes the sequence of application messages. In general, the sequence of application messages is arranged so that the TM data is sent in chronological order. However, when the presentation processor 60 sends a "request to send TM & LCR (00)", the collection processor 50 should respond as follows:

1. here is MENO (02)—as many as necessary
2. here is end of MENO (03)
3. here is TM data (04)—as many as necessary
4. here is end of TM data (05) : the TM data will be applied in accordance with the MENO given by item 1 above
5. repeat "1,2,3 and 4" when there be a new MENO
6. here is LCR TM data (06)—as many as necessary
7. here is end of LCR TM data (07)
8. here is LCR queue data (08)—as many as necessary
9. here is end of LCR queue data (09)
10. completion of request to send TM & LCR (01)

Based on the foregoing, it should be clear that the present invention provides a method and apparatus for communicating data using a fault tolerant protocol in which messages are exchanged in a format allowing for improved error detection and recovery, flow control and retransmission. Important features of the protocol described herein include initial synchronization, sequential transmission of messages and retransmission of damaged or lost messages.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention.

What is claimed is:

1. In a private branch exchange telephone system including a collection processor for the collection of data relating to telephone traffic in the system and a presentation processor for the graphical presentation of said data, a data communications system for controlling the transfer of said data from said collection processor to said presentation processor, said data communications system comprising:

means for initially synchronizing the flow of messages between said collection processor and said presentation processor, said means for initially synchronizing residing in part at said collection processor and in part at said presentation processor;

means for sending messages requesting specific data, said means for sending messages requesting specific data residing at said presentation processor;

means for sending messages comprising data responsive to said messages requesting specific data, said means for sending messages comprising data responsive to said messages requesting specific data residing at said collection processor;

means for checking that each of said messages comprising data responsive to said messages requesting data is correctly received, said means residing at said presentation processor; and wherein said messages are exchanged in a format allowing for error detection and recovery, flow control and retransmission 2. A data communications system according to claim 1 wherein said format comprises a packet of information in fields including:
   a header field;
   an overhead field;
   a message contents field;
   a verification field; and
   an end mark field.

3. A data communications system according to claim 1 wherein said synchronizing means comprises means for transmitting a start message residing at said presentation processor and means for transmitting an acknowledge start message in response to said start message residing at said collection processor.

4. A data communications system according to claim 1 wherein said checking means comprises means for transmitting an acknowledge message when a text message is correctly received, said means for transmitting an acknowledge message residing at said presentation processor.

5. In a system for the collection and presentation of telephone traffic, a method of communicating data between a collection processor and a presentation processor using messages configured according to a message format which allows for error detection and recovery, flow control and retransmissions, said method comprising the steps of:

transmitting a start message from said presentation processor to said collection processor to initiate communication;

transmitting an acknowledge start message from said collection processor to said presentation processor in response to said start message;

transmitting messages containing data processing request signals from said presentation processor to said collection processor following the receipt of said acknowledge start message;

transmitting messages containing data corresponding to said data processing request signals from said collection processor to said presentation processor; and transmitting a terminate message from said presentation processor to said collection processor to terminate communication.

6. A method according to claim 5 further comprising the step of transmitting an acknowledge terminate message from said collection processor to said presentation processor in response to said terminate message.

7. A method according to claim 5 wherein said message format includes:
a header field;
an overhead field;
a message contents field;
a verification field; and
an end mark field.

8. A method according to claim 5 wherein said message format includes:
a start text byte having a value of "FF" hex;
a message length byte which specifies the number of bytes following said message length byte;
a message sequence number byte which identifies a particular message for purposes of retransmission;
a message type byte which specifies the operational nature of said particular message;
a variable number of message contents bytes, said variable number being dependent on the value of said message type byte;
an exclusive OR sum byte used for error checking and correction; and
an end text byte having a value of "FF" hex.

* * * * *